UNITED STATES PATENT OFFICE.

THURSTON GORDON HALL, OF CHICAGO, ILLINOIS, ASSIGNOR TO THE INTERNATIONAL OIL AND REFINING COMPANY OF MICHIGAN.

PROCESS OF REFINING HYDROCARBON OIL.

SPECIFICATION forming part of Letters Patent No. 372,672, dated November 8, 1887.

Original application filed January 27, 1887, Serial No. 225,689. Divided and this application filed May 21, 1887. Serial No. 239,001.

(No specimens.)

*To all whom it may concern:*

Be it known that I, THURSTON GORDON HALL, of the city of Chicago, county of Cook, and State of Illinois, have invented a new and useful Process of Refining Hydrocarbon Oils, of which the following is a full, true, and exact description.

I have discovered a process of altering the character of hydrocarbon oils by subjecting the same under certain conditions to the action of a high temperature when mingled with steam. In order to subject the mingled vapors of steam and oil to this temperature, it is essential that they should be brought in contact with considerable surfaces of the heating body, and subsequently condensed.

I will describe my process especially as applied to Canadian crude oils, which contain a considerable percentage of sulphur.

In carrying out this process I provide a converter, which may be of any suitable shape, provided the requisite temperature can be attained in it. In practice I find that a cylindrical converter without tubes works well, though one with tubes may likewise be employed. This converter I make preferably of a diameter of about ten feet and of a length of about thirty feet, and I fill it a little more than half-full with fragments of granite, which may be about two or three inches in diameter. Into the bottom of this still, through a suitable perforated pipe or pipes, preferably extending the length of the still, I inject the crude oil and steam, preferably using a steam injector. The still itself must be so constructed as that a high temperature may be obtained, especially in the upper part of the granite. This temperature preferably ranges from 420° to 460° Fahrenheit, though higher temperatures are useful under some conditions. In the presence of highly-heated blocks of granite at these temperatures the sulphur leaves the oil, and in the condition of sulphureted hydrogen passes into the water, where it can be readily detected by the usual tests. The vapors of oil and water are condensed in the usual way in a condenser, and the oil and water are separated by gravity at the end. I find as a result of this treatment that the specific gravity of the oil has been diminished, or its degrees, Baumé, increased. Approximately taking, say, a 32° gravity Canadian oil, I find the gravity of this first run to be from 47° to 48° on an average. I preferably, then, take this oil, the gravity of which has been increased from about 32° to 48° Baumé, and rerun it through the same converter and condenser as before, with an additional supply of steam. The result of this second treatment is to still further purify it. The average gravity will likewise be somewhat increased in this second run, generally from one to two degrees.

I do not in this application limit myself to the specific material granite as a converting agent, though I find that to work very satisfactorily under the conditions named. I have found, for instance, that other materials—such as marble, quicklime, and cryolite—give satisfactory results; and I believe the action is due not to the body used, but to the exposure of the large surfaces of material capable of acting upon the mingled vapors of steam and oil at proper converting temperatures. I have obtained very excellent results from lime.

An apparatus suitable for carrying on this process is shown in my application, No. 225,689, filed January 27, 1887.

What I claim as my invention, and desire to secure by Letters Patent, is—

The process of manufacturing hydrocarbon oil, which consists in subjecting the mingled vapors of a hydrocarbon oil and steam to large converting-surfaces of granite or equivalent material heated to a temperature above 420° Fahrenheit, by passing said vapors through and in contact with the converting material, and in subsequently condensing the same, substantially as described.

In testimony whereof I have signed my name to this specification in the presence of two subscribing witnesses.

THURSTON GORDON HALL.

Witnesses:
ANTHONY GREF,
H. COUTANT.